(12) United States Patent
Scrivano et al.

(10) Patent No.: US 10,768,919 B2
(45) Date of Patent: Sep. 8, 2020

(54) PACKAGE INSTALLATION ON A HOST FILE SYSTEM USING A CONTAINER

(71) Applicant: Red Hat, Inc., Raleigh, NC (US)

(72) Inventors: Giuseppe Scrivano, Spezzano della Sila (IT); Colin Walters, Westford, MA (US); Daniel Walsh, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/572,472

(22) Filed: Sep. 16, 2019

(65) Prior Publication Data

US 2020/0012485 A1  Jan. 9, 2020

Related U.S. Application Data

(63) Continuation of application No. 15/596,810, filed on May 16, 2017, now Pat. No. 10,416,979.

(51) Int. Cl.
*G06F 8/61* (2018.01)

(52) U.S. Cl.
CPC ..................... *G06F 8/63* (2013.01)

(58) Field of Classification Search
None
See application file for complete search history.

(56) References Cited

U.S. PATENT DOCUMENTS

| | | | |
|---|---|---|---|
| 6,523,166 B1 | 2/2003 | Mishra et al. | |
| 7,562,078 B1 * | 7/2009 | Yadav | G06F 16/10 |
| 7,895,296 B1 * | 2/2011 | Dayan | G06F 21/53 |
| | | | 709/217 |
| 8,316,364 B2 | 11/2012 | Stein | |
| 8,843,921 B1 | 9/2014 | Protassov et al. | |
| 9,165,456 B2 | 10/2015 | Grady | |
| 9,454,398 B2 * | 9/2016 | Hacker | G06F 9/46 |
| 9,475,612 B2 | 10/2016 | Zhu et al. | |
| 9,495,410 B1 | 11/2016 | Bhudavaram et al. | |
| 9,763,062 B2 | 9/2017 | Ibarra | |
| 10,416,979 B2 * | 9/2019 | Scrivano | G06F 8/63 |
| 2002/0049760 A1 | 4/2002 | Scott | |
| 2006/0048144 A1 | 3/2006 | Willess | |

(Continued)

FOREIGN PATENT DOCUMENTS

| | | | | |
|---|---|---|---|---|
| WO | WO 2005111773 | | 11/2005 | |
| WO | WO-2005111773 A2 * | | 11/2005 | G06F 16/10 |

OTHER PUBLICATIONS

Rubens, Containers and Cloud Computing, 2017, Datamation at https://www.datamation.com/cloud-computing/containers.html (Year: 2017).*

(Continued)

*Primary Examiner* — Hossain M Morshed
(74) *Attorney, Agent, or Firm* — Haynes and Boone, LLP (57) ABSTRACT

An example method of installing one or more files on a host file system includes extracting, by an operating system, a container image from a container. The container image stores a set of files and provides an indication of a hierarchical structure for the set of files. The method also includes obtaining, by the operating system, a package in accordance with the container image. The package includes the set of files. The method further includes installing the package on the host file system in accordance with the hierarchical structure for the set of files.

20 Claims, 5 Drawing Sheets

(56) References Cited

U.S. PATENT DOCUMENTS

| | | | |
|---|---|---|---|
| 2006/0277537 A1* | 12/2006 | Chan | G06F 8/65 717/168 |
| 2008/0130639 A1 | 6/2008 | Costa-Requena | |
| 2011/0119662 A1 | 5/2011 | Chen | |
| 2013/0067600 A1* | 3/2013 | Graham | G06F 21/335 726/30 |
| 2014/0223424 A1 | 8/2014 | Han | |
| 2016/0080198 A1 | 3/2016 | Liu | |
| 2016/0359859 A1 | 12/2016 | Capone | |
| 2018/0060055 A1* | 3/2018 | Kirkpatrick | G06F 9/44521 |
| 2018/0143819 A1 | 5/2018 | Gross | |

OTHER PUBLICATIONS

StackOverflow, "Copying files from host to Docker container", 2014, StackOverflow at https://stackoverflow.com/questions/22907231/copying-files-from-host-to-docker-container?utm_medium=organic&utm_source=google_rich_qa&utm_campaign=google_rich_qa (Year: 2014).*

Moving a File from the Host System to a Container via Docker CP #5846, https://github.com/docker/docker/issues/5846.

Robert Malai, Docker—A Different Breed of Virtualization, 3Pillar Global, https://www.3pillarglobal.com/insights/docker-different-breed-virtualization.

Arjan Van De Ven, An Introduction to Clear Containers, May 18, 2015, https://lwn.net/Articles/644675/.

Rubens, "Containers and Cloud Computing", Apr. 10, 2017, published at https://www.datamation.com/cloudcomputing/containers.html.

StackOverflow, "Copying files from host to Docket container", 2014, published at https://stackove rf low .co m/qu estions/2290 7231 /copyi ng-f i l es-from-host-to-docker-container?utm_medium=organic&utm_source=google_rich_qa&utm_campaign=google_rich_qa.

Prigent, "Working with Windows Containers and Docker: Into your Stride", May 2017, published at https://www.redgate.com/simple-talk/sysadmin/virtualization/working-windows-containers-docker-stride/.

Pip, "How to download and install Python Packages and Modules with Pip", 2015, published at https://www.youtube.com/watch?v=jnpC_lb_lbc.

Degioanni, "Let there be Light—Sysdig Adds Container Visibility", 2015, Published at https://sysdig.com/blog/let-light-sysdigadds-container-visibility/.

Ropnop, "Plundering Docker Images", 2016, published at https://blog.ropnop.com/plundering-docker-images/.

* cited by examiner

PACKAGE INSTALLATION ON A HOST FILE SYSTEM USING A CONTAINER

CROSS REFERENCE TO RELATED APPLICATIONS

This application is a continuation of U.S. application Ser. No. 15/596,810, filed May 16, 2017, entitled "Package Installation on a Host File System Using a Container," which is incorporated by reference in its entirety herein.

BACKGROUND

The present disclosure generally relates to computing devices, and more particularly to installing files on a host file system.

A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine.

BRIEF SUMMARY

Methods, systems, and techniques for installing one or more files on a host file system are provided. An example method of installing one or more files on a host file system includes extracting, by an operating system, a container image from a container. The container image stores a set of files and provides an indication of a hierarchical structure for the set of files. The method also includes obtaining, by the operating system, a package in accordance with the container image. The package includes the set of files. The method further includes installing the package on the host file system in accordance with the hierarchical structure for the set of files.

An example system for installing one or more files to a host file system includes an extraction module that extracts a container image from a container. The container image stores a set of files and provides an indication of a hierarchical structure for the set of files. The system also includes a package manager that obtains a package including the set of files. The package manager installs the package on the host file system in accordance with the hierarchical structure for the set of files.

An example machine-readable medium includes a plurality of machine-readable instructions that when executed by one or more processors is adapted to cause the one or more processors to perform a method including: extracting, by an operating system, a container image from a container, the container image storing a set of files and providing an indication of a hierarchical structure for the set of files; obtaining, by the operating system, a package in accordance with the container image, the package including the set of files; and installing the package on the host file system in accordance with the hierarchical structure for the set of files.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

An operating system manages programs in a computer system. A program may be, for example, an application executing in the computer system. In order to run, application software code may be tightly bound to the operating system. The tight coupling between the application software code and the operating system may be disadvantageous when considering third-party applications. For example, if a software agent associated with the operating system management software comes with a utility library, it may be undesirable for other aspects of the operating system to view that library. Conversely, if an update to the operating system occurs, it may be desirable for the utility library to be isolated from the operating system update.

A solution to the problem of an operating system being allowed to view code (e.g., data, a library, etc.) that a user would prefer to keep "hidden" from the operating system and the problem of updates to the operating system affecting unintended code may provide for a container that stores an image of files representative of what the user desires to isolate. The files stored in the container may be separate from the rest of the system and may be installed as an extension to the operating system. Accordingly, visibility to the entire host file system may be reduced to the appropriate components. Additionally, updates to the operating system may occur in isolation from the container.

Additionally, an application may install files on the host file system. These files, however, may not be tracked by the host management software. It may be desirable to track files that are installed on the host file system. A solution to the problem of these files not being tracked may be solved by using a container that stores an image of these files. The host management software may track files that are included in containers.

A container is an isolated processing space that can exist on top of a virtual machine or on top of actual hardware. The container may be viewed as a lightweight virtual machine that is used to create environments and may share the operating system with the host machine, preserving resources. In an example, a container may offer software that creates virtual environments mimicking a full virtual machine. A container may also offer other useful benefits.

An example system for installing one or more files to a host file system includes an extraction module that extracts a container image from a container. The container image stores a set of files and provides an indication of a hierarchical structure for the set of files. The system also includes a package manager that obtains a package including the set of files. The package manager installs the package on the host file system in accordance with the hierarchical structure for the set of files.

The present disclosure provides techniques for installing one or more files on a host file system. The installed files may be an extension to the operating system. Unless specifically stated otherwise, as apparent from the following discussion, it is appreciated that throughout the description, discussions utilizing terms such as "determining," "storing," "extracting," "receiving," "sending," "obtaining," "executing," "installing," "tracking," "searching," "mapping," and "copying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
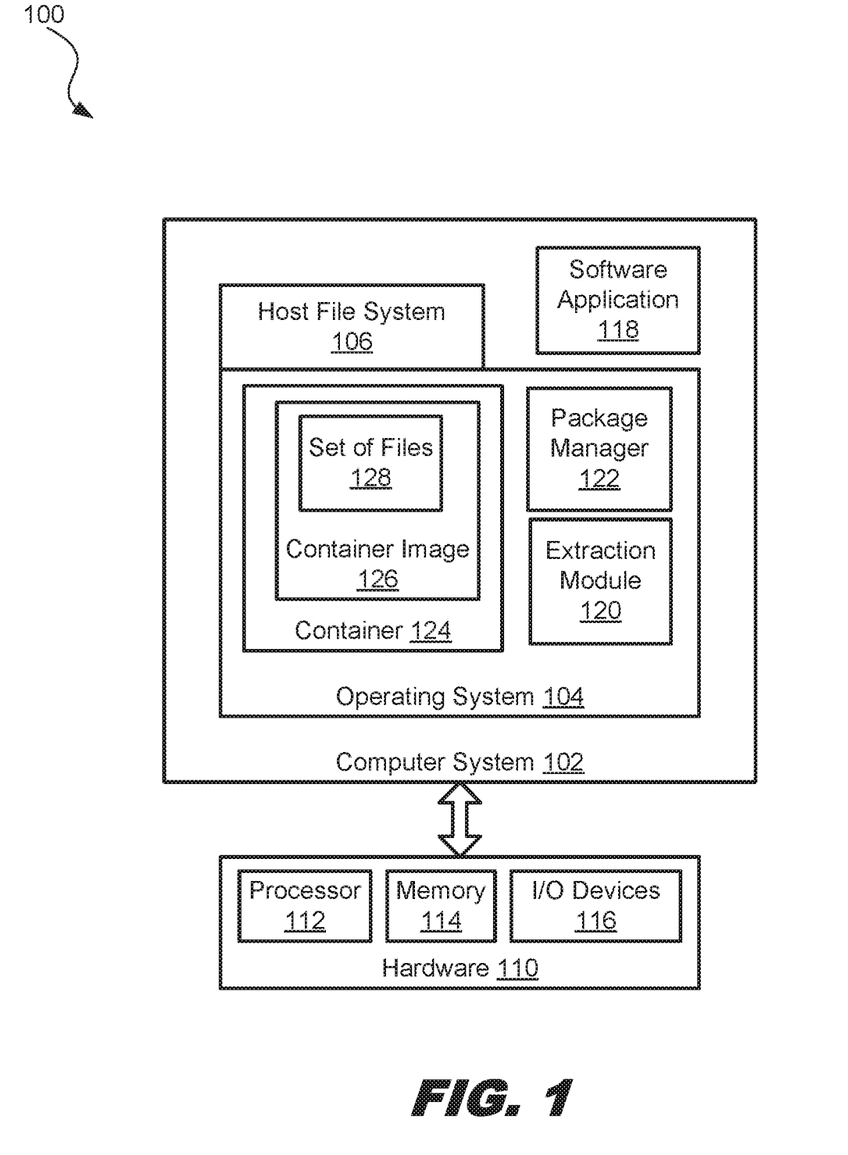
FIG. 1 is a diagram illustrating an example system for installing one or more files on a host file system.

FIG. 1 is a diagram illustrating an example system 100 for installing one or more files on a host file system. System 100 may use containers for installing extensions to an operating system and tracking ownership of these files in the same way as other files, as if they were part of the operating system bundle. Additionally, the extensions may be installed, updated, and/or rolled back together with the operating system, so that it is possible to validate the entire system with the extensions installed, or may be isolated from updates to the operating system.

System 100 includes a computer system 102 that may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 is coupled to hardware 110 such as a processor 112 for executing software (e.g., machine-readable instructions) and using or updating data stored in memory 114. Hardware 110 may include one or more processors 112. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system 104 and various other software applications 118. Hardware 110 may include other I/O devices 116.

Computer system 102 includes an operating system 104 that serves as a central component for facilitating communication between software applications 118 and hardware devices (e.g., processor 112, memory 114, and I/O devices 116) of a machine. Operating system 104 may be responsible for facilitating operating system functions and various management tasks (e.g., process management, disk management, and memory management). For example, operating system 104 manages, organizes, and keeps track of files stored on computer system 102. In an example, operating system 104 keeps track of where files are stored on the system, determines how the files are stored, links files to their owners, distinguishes between different file types (e.g., text files, binary files, and directory files), etc. In the example illustrated in FIG. 1, operating system 104 may manage files using a host file system 106. Host file system 106 may store one or more files, which may be structured as a collection of records or a sequence of bytes.

In an example, host file system 106 is a hierarchical file system. Operating system 104 may organize files into a hierarchical or more complex structure to reflect the relationships among the files, thus providing a comprehensive and easy-to-understand view of the files to the user. For example, a directory is a special type of file that has lists of files and their attributes. In an example, a first directory may store one or more files, where one of these files may be a second directory. Likewise, the second directory may store one or more files, which may or may not include a third directory. The first directory may be referred to as being at a "higher level" than the second directory. Conversely, the second directory may be referred to as being at a "lower level" or "deeper level" than the first directory.

Operating system 104 may load container 124, which shares the same kernel of the host. Container 124 may include an entire runtime environment: an application, plus all its dependencies, libraries and other binaries, and configuration files needed to run it, bundled into one package. A container may run one or more applications on the local host (e.g., computer system 102), on physical or virtual machines in a data center, or in the cloud. A container may provide additional protection to limit what actions may be performed from within the container.

In the example illustrated in FIG. 1, container 124 includes a container image 126 that can be used to integrate files as an extension to operating system 104. Container 124 may be self-contained and independent from the host. Additionally, container 124 may have "hooks" into the host. Container 124 may be, for example, a DOCKER® or an Open Container Initiative (OCI™) container. Container image 126 stores a set of files 128 and provides an indication of a hierarchical structure for the set of files. In an example, container image 126 includes a tar or zip file. When container 124 is launched, container 124 may run a single process. The single process may run an application. In an example, set of files 128 includes one or more configuration files. A configuration file may be used to configure the application (e.g., software application 118). Although computer system 102 is illustrated as including one container, it should be understood that computer system 102 may include more than one container.

Operating system 104 also includes an extraction module 120 and a package manager 122. As will be explained in more detail, container 124 may be used as a transport store that includes container image 126. On computer system 102, extraction module 120 may extract container image 126 from container 124. Package manager 122 obtains a package in accordance with container image 126, and installs the package on host file system 106 in accordance with the hierarchical structure for the set of files. In this example, package manager 122 may install set of files 128 on host file system 106 such that set of files 128 is stored in a traditional location and can be passed to the container when it runs.

Figure 2:
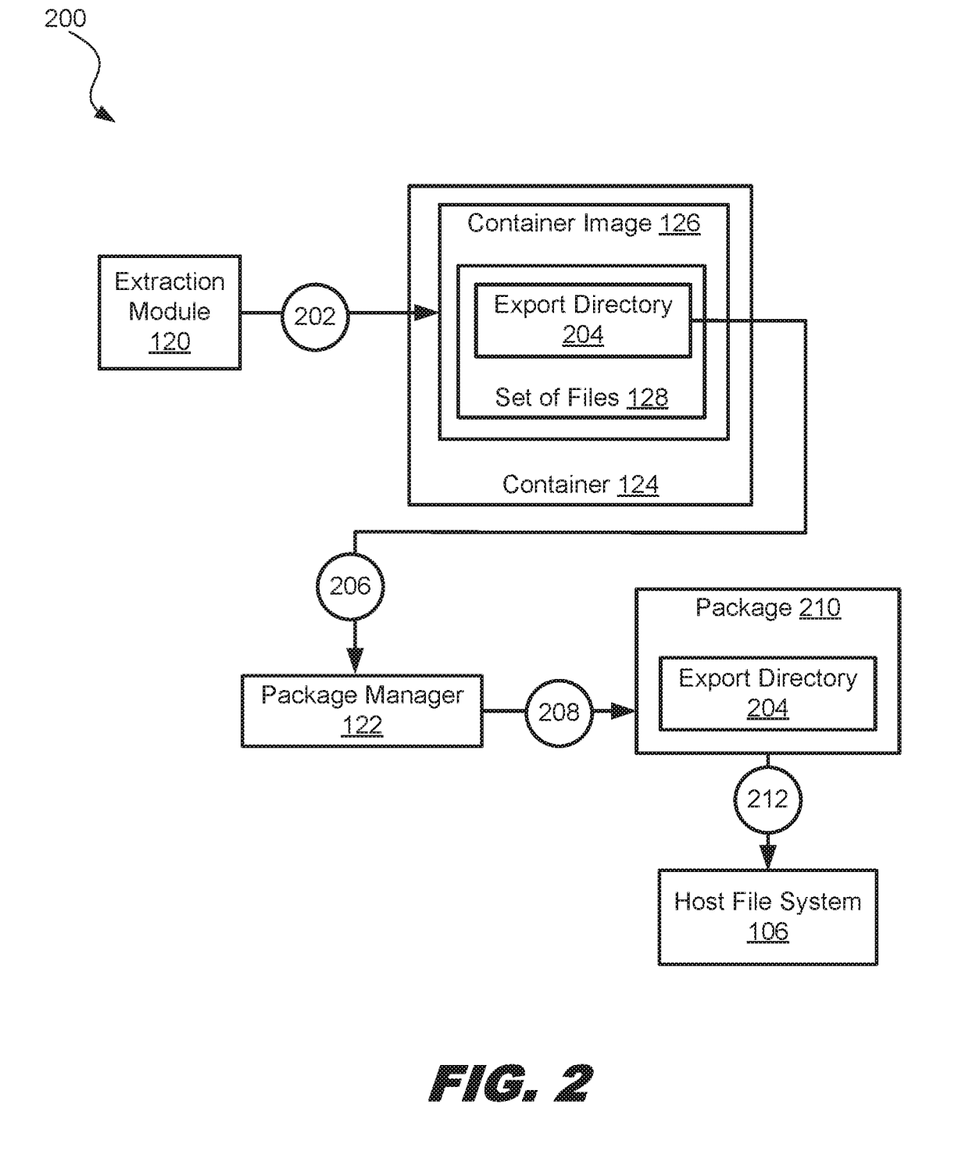
FIG. 2 is an example process flow for installing one or more files on the host file system.

Package manager 122 may distribute software packages using containers. FIG. 2 is an example process flow 200 for installing one or more files on host file system 106. In FIG. 2, at action 202, extraction module 120 extracts container image 126 from container 124. Container 124 may define a root file system and stores set of files 128. Within container 124 is an indication of a hierarchical structure for the set of files. Set of files 128 includes an export directory 204, which is a directory structure within container 124 to indicate which files should be exported to operating system 104. Export directory 204 includes a subset of set of files 128 in accordance with a hierarchical structure. In an example, container image 126 is a tarball or zip file including a group of files that are bundled together.

Extraction module 120 may extract container image 126 from container 124 so that it can be inspected. Extraction module 120 may inspect container image 126 and search through it to identify files within the container image. At action 206, extraction module 120 may search container image 126 for export directory 204, which stores files to be exported to operating system 104. Exporting a file included in container image 126 to operating system 104 may include copying the file and storing it in a package. The structure of export directory may also be exported to the package such that the relationships of the files included in the export directory may be reproduced. In an example, while extraction module extracts and inspects container image 126, no software code is running from container 124. In an example, container 124 does not contain the actual code for the container, unlike traditional containers.

At action 208, package manager 122 obtains a package 210 that includes the files included in export directory 204. In an example, package manager 122 creates package 210 on-the-fly once operating system 104 loads container 124. Package manager 122 may use the information inside export directory 204 to create package 210. In another example, package 210 is pre-installed with operating system 104 and is bound to a version of the operating system. In some examples, package 210 includes both container 124 and the configuration files exported to operating system 104. In some examples, package 210 does not include container 124. Export directory 204 is exported from container 124 to host file system 106 through the use of package 210, which serves as "bridge" that binds container 124 and host file system 106.

At action 212, package manager 122 installs package 210 on host file system 106 in accordance with the hierarchical structure of export directory 204. In an example, installing package 210 on host file system 106 includes installing an extension to operating system 104. In this example, the specific files stored in export directory 204 are part of package 210 and are eventually installed as part of operating system 104. Package manager 122 may install the package by mapping and copying export directory 204 and the files included in the export directory in accordance with the hierarchical structure for the export directory to host file system 106. In an example, package manager 122 maps files included in export directory 204 to a root of host file system 106. Package manager 122 may mount the files included in export directory 204 on host file system 106 in accordance with the hierarchical structure. After package manager 122 finishes installing package 210 on host file system 106, container 124 and host file system 106 may have a common (or the same) directory tree.

Inside container 124 may be a directory to be installed on host file system 106. In an example, export directory 204 and host file system 106 include one or more common directory trees. For example, all files present in export directory 204 under "/exports/hostfs" may be mapped to host file system 106. For instance, a file "/exports/hostfs/etc/sysctl.d/11-container.conf" may be mapped and copied to the host "/etc/sysctl.d/11-container.conf" file. The same structure is maintained in the package and mapped to the host. Accordingly, package manager 122 may copy a file included in the package to any location on host file system 106. In an example, the mapping may include identifying a relative pathname (such as by traversing the directory tree and dropping a first part of the absolute file path) and mapping the files under this relative pathname to the root of host file system 106. In an example, a first file stored on host file system 106 is a copy of a second file in export directory 204. At least a portion of the first file's pathname may be the same as at least a portion of the second file's pathname. The set of files installed on host file system 106 is visible from the container.

Additionally, package manager 122 may manage and track multiple files and/or packages installed on host file system 106, similar to how package manager 122 would for any other application. In an example, package manager 122 tracks each file included in a package and links the file to its respective owner (the package that included the file). The owner of a file is the package that included the file. Package manager 122 may query a file to determine its owner. In an example, package 210 is an RPM package, which is an open packaging system that runs on an operating system. Package manager 122 may maintain a database of installed packages and their files and may invoke queries and verifications on computer system 102.

It should be understood that additional actions may be performed before, during, or after actions 202, 206, 208, and/or 212 discussed above. Actions 202, 206, 208, and/or 212 may occur while operating system 104 is loading container 124. Additionally, while container 124 is running, operating system 104 may pass one or more files included in package 210 to container 124. Although a tree-like structure was used in this example, it should be understood that other data structures may be used to indicate the relationship between files.

Figure 3:
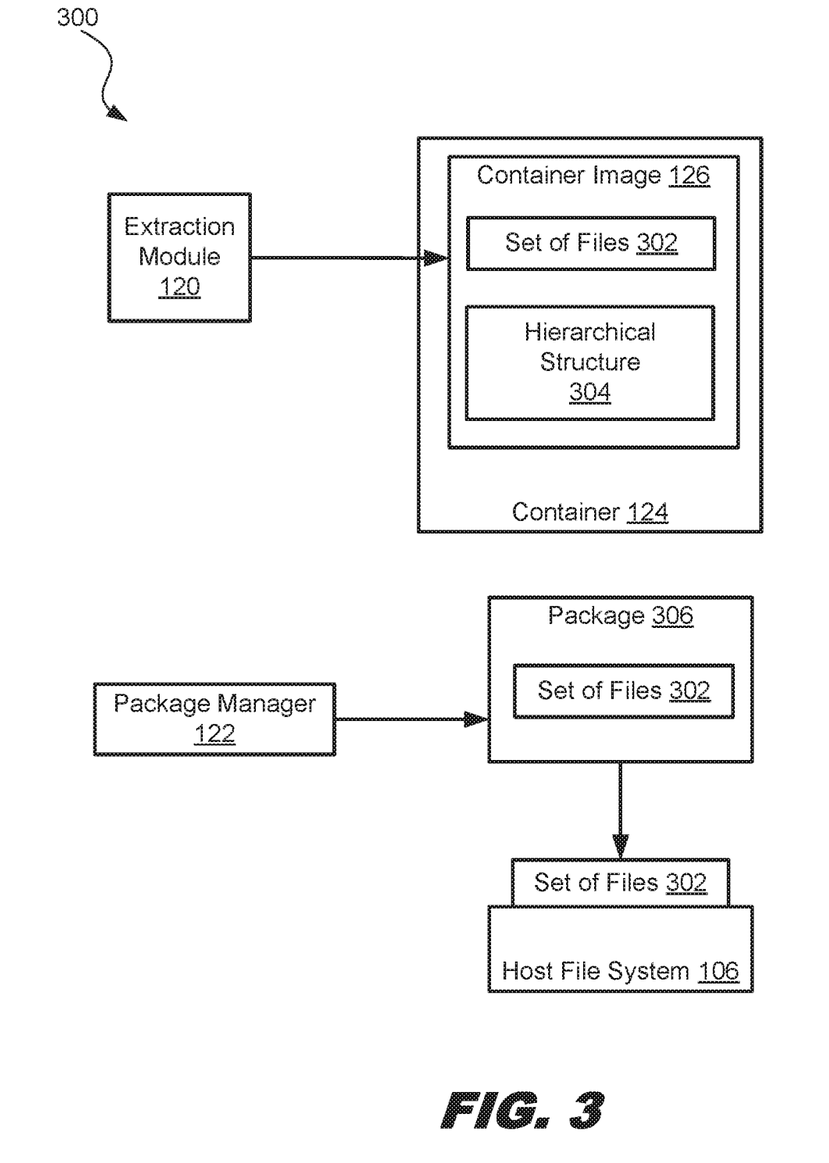
FIG. 3 is another example system for installing one or more files on a host file system.

FIG. 3 is another example system 300 for installing one or more files on a host file system. In the example illustrated in FIG. 3, extraction module 120 extracts container image 126 from container 124. Container image 126 stores a set of files 302 and a hierarchical structure 304. Hierarchical structure 304 provides an indication of the hierarchical structure for the set of files 302. Package manager 122 obtains package 306 including set of files 302, which may be a subset of the files stored on container image 126. Package manager 122 installs package 306 on host file system 106 in accordance with hierarchical structure 304.

Figure 4:
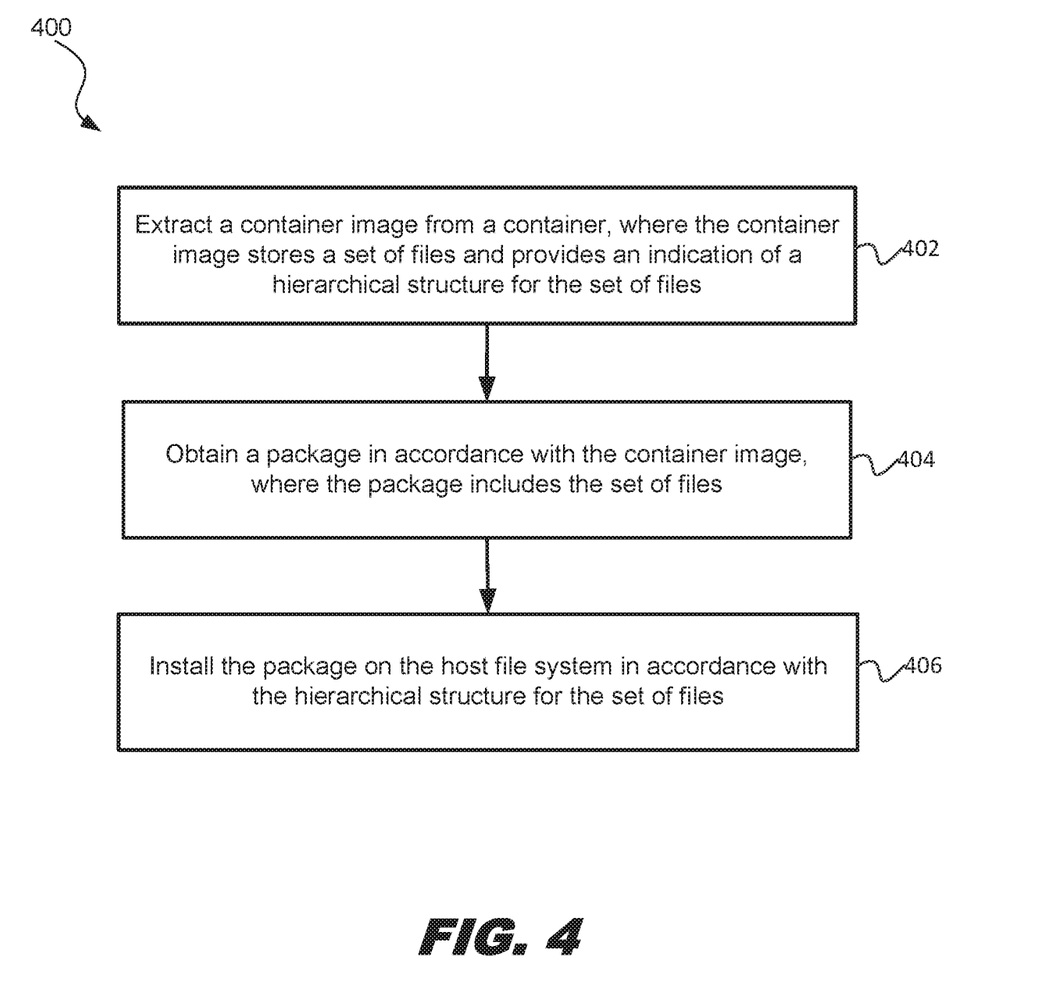
FIG. 4 is a flowchart illustrating an example method of installing one or more files on a host file system.

FIG. 4 is a flowchart illustrating an example method 400 of installing one or more files on a host file system. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and/or actions that are described may be removed.

Method 400 includes blocks 402, 404, and/or 406. In block 402, extraction module 120 extracts container image 126 from container 124, where container image 126 stores set of files 302 and provides an indication of a hierarchical structure for the set of files. In block 404, package manager 122 obtains package 306 in accordance with container image 126, where the package includes set of files 302. In block 406, package manager 122 installs package 306 on host file system 106 in accordance with the hierarchical structure for the set of files. It is understood that additional blocks may be performed before, during, or after blocks 402, 404, and/or 406 discussed above. As discussed above and further emphasized here, FIGS. 1-4 are merely examples, which should not unduly limit the scope of the claims.

Figure 5:
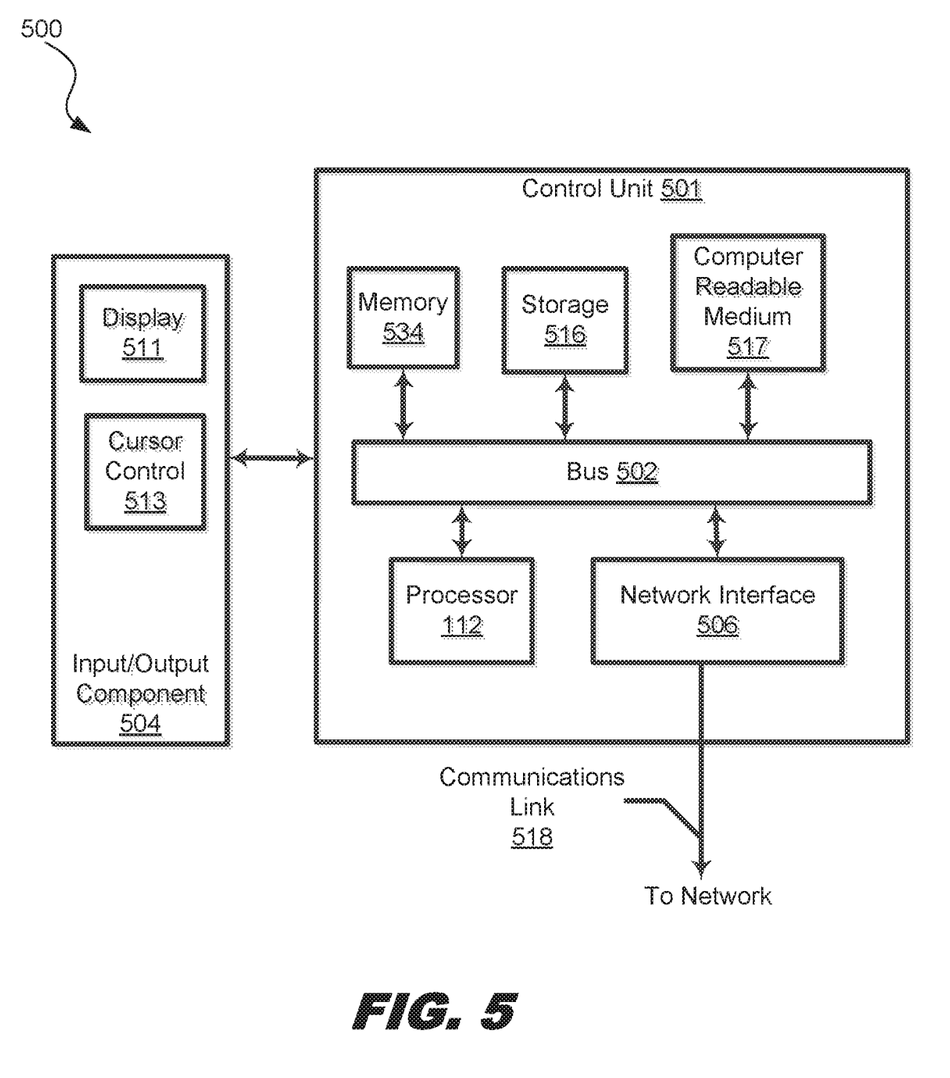
FIG. 5 is a block diagram of a computer system suitable for implementing one or more examples of the present disclosure.

FIG. 5 is a block diagram of a computer system 500 suitable for implementing one or more examples of the present disclosure. In various implementations, computer system 500 corresponds to computer system 102, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an I/O component 504 that processes a user action, such as selecting keys from a keypad/keyboard or selecting one or more buttons or links, and sends a corresponding signal to bus 502. In an example, a user may request computer system 500 to load container 124 using I/O component 504. I/O component 504 may also include an output component such as a display 511, and an input control such as a cursor control 513 (such as a keyboard, keypad, or mouse).

A transceiver or network interface 506 transmits and receives signals between computer system 500 and other devices via a communications link 518 to a network. In an example, the transmission is wireless, although other transmission mediums and methods may also be suitable. Processor 112, which may be a micro-controller, digital signal processor (DSP), or other processing component, processes these various signals, such as for display on computer system 500 or transmission to other devices via communications link 518. Processor 112 may also control transmission of information, such as cookies or IP addresses, to other devices.

Components of computer system 500 also include a system memory component 534 (e.g., RAM), a static storage component 516 (e.g., ROM), and/or a disk drive 517. Computer system 500 performs specific operations by processor 112 and other components by executing one or more sequences of instructions contained in system memory component 534. Logic may be encoded in a computer readable medium, which may refer to any medium that participates in providing instructions to processor 112 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 400) to practice the present disclosure may be performed by computer system 500. In various other examples, a plurality of computer systems 500 coupled by communication links 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks, steps, or actions described herein may be changed, combined into composite blocks, steps, or composite actions, and/or separated into sub-blocks, sub-steps, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of installing one or more files on a host file system, comprising:
    extracting, by an operating system, a container image from a container, the container image storing a set of files;
    searching the set of files for an export directory, the export directory being a directory structure within the container and indicating a subset of the set of files for exporting to the operating system, and the subset of files being in accordance with a hierarchical structure;
    obtaining, by the operating system, a package including the subset of files in accordance with the export directory and the hierarchical structure; and
    installing the package on the host file system in accordance with the hierarchical structure of the export directory.

2. The method of claim 1, wherein the container defines a root file system.

3. The method of claim 1, comprising:
    exporting the subset of files to the operating system.

4. The method of claim 3, wherein exporting a first file of the subset of files includes copying the first file and storing the copy of the first file in the package.

5. The method of claim 3, wherein exporting the subset of files includes exporting a structure of the export directory to the package.

6. The method of claim 1, comprising:
    loading the container including the container image, wherein obtaining the package includes creating the package on-the-fly after loading the container.

7. The method of claim 1, wherein the package includes the container.

8. The method of claim 1, comprising:
    mapping the subset of files included in the export directory to a root of the host file system; and
    mounting the subset of files on the host file system in accordance with the root of the host file system and the hierarchical structure.

9. The method of claim 8, wherein mapping the subset of files to the root includes identifying a relative pathname and mapping the subset of files under the relative pathname to the root of the host file system.

10. The method of claim 9, comprising:
    traversing a directory tree including the relative pathname, wherein identifying the relative pathname includes dropping a first part of an absolute file path included in the directory tree.

11. A system for installing one or more files on a host file system, comprising:
    an extraction module that extracts a container image from a container and searches the container image storing a set of files for an export directory, wherein the export directory is a directory structure within the container and indicates a subset of the set of files for exporting to an operating system, and the subset of files is in accordance with a hierarchical structure; and
    a package manager that creates a package including the subset of files in accordance with the export directory and the hierarchical structure and that installs the package on the host file system in accordance with the hierarchical structure for the set of files, wherein the operating system includes the extraction module and the package manager.

12. The system of claim 11, wherein the package is pre-installed with the operating system.

13. The system of claim 11, wherein the package is bound to a version of the operating system.

14. The system of claim 13, wherein the package manager creates the package on-the-fly.

15. The system of claim 11, wherein after the package is installed on the host file system, the container and the host file system have a common directory tree.

16. The system of claim 11, wherein the set of files installed on the host file system is visible from the container.

17. The system of claim 11, wherein the package manager tracks one or more packages installed on the host file system and links an owner of a given package to the given package.

18. A non-transitory machine-readable medium comprising a plurality of machine-readable instructions that when executed by one or more processors is adapted to cause the one or more processors to perform a method comprising:
    extracting, by an operating system, a container image from a container, the container image storing a set of files;
    searching the set of files for an export directory, the export directory being a directory structure within the container and indicating a subset of the set of files for exporting to the operating system, and the subset of files being in accordance with a hierarchical structure;
    obtaining, by the operating system, a package including the subset of files in accordance with the export directory and the hierarchical structure; and
    installing the package on a host file system in accordance with the hierarchical structure of the export directory.

19. The non-transitory machine-readable medium of claim 18, wherein the set of files installed on the host file system is visible from the container.

20. The non-transitory machine-readable medium of claim 18, wherein the package includes the container.

* * * * *